United States Patent
Zhou et al.

(10) Patent No.: US 11,794,215 B1
(45) Date of Patent: Oct. 24, 2023

(54) TIRE MOLD CLEANING DEVICE

(71) Applicant: Suzhou Aisilan Optoelectronics Co., Ltd., Suzhou (CN)

(72) Inventors: Qian Zhou, Suzhou (CN); Jian Zhou, Suzhou (CN); Lu Xu, Suzhou (CN); Yun Liu, Suzhou (CN); Biao Zhou, Suzhou (CN); ZhongYing Yang, Suzhou (CN)

(73) Assignee: Suzhou Aisilan Optoelectronics Co., Ltd., Suzhou (CN)

( * ) Notice: Subject to any disclaimer, the term of this patent is extended or adjusted under 35 U.S.C. 154(b) by 0 days.

(21) Appl. No.: 18/124,364

(22) Filed: Mar. 21, 2023

(30) Foreign Application Priority Data

Dec. 16, 2022 (CN) .......................... 202211617372.X

(51) Int. Cl.
  *B08B 7/00* (2006.01)
  *B29C 33/72* (2006.01)
  *B08B 1/00* (2006.01)
  *B08B 1/04* (2006.01)
  *B08B 13/00* (2006.01)

(52) U.S. Cl.
  CPC ............... *B08B 1/001* (2013.01); *B08B 1/04* (2013.01); *B08B 7/0042* (2013.01); *B08B 13/00* (2013.01); *B29C 33/72* (2013.01)

(58) Field of Classification Search
  CPC . B29C 33/72; B29D 2030/0663; B08B 1/001; B08B 1/04; B08B 7/00; B08B 7/0042; B08B 7/035
  See application file for complete search history.

(56) References Cited

FOREIGN PATENT DOCUMENTS

| CN | 214982525 U | * 12/2021 |
| CN | 114407248 A | 4/2022 |
| CN | 114904848 A | * 8/2022 |

OTHER PUBLICATIONS

CNIPA, Notification of a First Office Action for CN202211617372.X, dated Jan. 28, 2023.
Suzhou Usiland photoelectric Co., Ltd. (Applicant), Reply to Notification of a First Office Action for CN202211617372.X, w/ (allowed) replacement claims, dated Jan. 31, 2023.
CNIPA, Notification to grant patent right for invention in CN202211617372.X, dated Feb. 16, 2023.

* cited by examiner

*Primary Examiner* — Shay Karls
(74) *Attorney, Agent, or Firm* — Georgi Korobanov

(57) ABSTRACT

A tire mold cleaning device includes a protective cover, a cleaning mechanism, a loading mechanism and a limiting mechanism. The cleaning mechanism is disposed in the protective cover; the loading mechanism includes linear sliding rails and a loading platform, the linear sliding rails are mounted at a bottom end of an interior of the protective cover, and the loading platform is connected to movable ends of the linear sliding rails. The limiting mechanism includes a base plate and limiting rods, and the base plate is disposed on a bottom end of the interior of the protective cover. A tire mold is cleaned through cooperation of the linear sliding rails and the loading platform, the limiting rods can limit a moving range of the tire mold, thereby preventing the tire mold from sliding under the action of inertia.

10 Claims, 6 Drawing Sheets

TIRE MOLD CLEANING DEVICE

TECHNICAL FIELD

The disclosure relates to the technical field of tire molds, in particular to a tire mold cleaning device.

BACKGROUND

In the related art, tires are grounded rolling circular elastic rubber products assembled on various vehicles or machinery. Tire molds used in the tire production process must be cleaned regularly to save downtime.

While a tire mold cleaning device loads a tire mold, the tire mold is easy to deviate from a determined position, affecting a cleaning head of the tire mold cleaning device to clean the tire mold.

SUMMARY

The disclosure is intended to solve at least one of technical problems existing in the related art, and the disclosure proposes a tire mold cleaning device, which has a limiting function to make a loading position of the tire mold more accurate.

A tire mold cleaning device according to an embodiment of the disclosure includes: a protective cover, a cleaning mechanism, a loading mechanism, and a limiting mechanism. The cleaning mechanism is disposed inside the protective cover. The loading mechanism includes linear sliding rails and a loading platform, the linear sliding rails are mounted at bottom ends of an interior of the protective cover, and the loading platform is connected to movable ends of the linear sliding rails. The limiting mechanism includes a base plate and limiting rods, the base plate is disposed at a bottom side of the protective cover and inside the protective cover, a driving motor is disposed on an upper end face of the base plate, an output shaft of the driving motor is in transmission connection with a lead screw, a rod body of the lead screw is threadedly sleeved with a lifting plate, guide rods are mounted on the upper end face of the base plate, a top end of each of the guide rods slidably penetrates through the lifting plate, the number of the limiting rods is two, bottom ends of the two limiting rods are mounted on the upper end surface of the lifting plate, and a surface of the loading platform is provided with first through grooves corresponding to the lifting plate. Telescopic members are mounted on a lower end face of the lifting plate, a sliding plate is connected to movable ends of the telescopic members, two elastic telescopic rods are mounted on the upper end face of the sliding plate, and the surface of the loading platform is provided with second through grooves corresponding to the elastic telescopic rods.

In addition, the tire mold cleaning device according to embodiments of the disclosure further has the following additional technical features.

In an embodiment of the disclosure, a side wall of the protective cover is provided with an opening for entering and exiting, and the opening of the protective cover is provided with a lifting door.

In an embodiment of the disclosure, the cleaning mechanism includes a motion system, a single-shaft rotating assembly and a cleaning head, the motion system is mounted inside the protective cover, the single-shaft rotating assembly is connected to a movable end of the motion system, and the cleaning head is disposed at a rotating end of the single-shaft rotating assembly.

In an embodiment of the disclosure, the motion system is a rectangular coordinate robot, and the cleaning head is a laser cleaning head.

In an embodiment of the disclosure, the single-shaft rotating assembly includes a bracket and a speed reducer, the bracket is connected to the movable end of the motion system, the speed reducer is mounted at a top end of the bracket, an output shaft of the speed reducer is in transmission connection with a rotating shaft, and the cleaning head is connected to the rotating shaft.

In an embodiment of the disclosure, the guide rods, the limiting rods, the lead screw and the elastic telescopic rods are parallel to one another, and the number of the guide rods is at least two.

In an embodiment of the disclosure, each of the elastic telescopic rods includes an inner rod body and an outer cylinder body, the inner rod body is fixed on the upper end face of the lifting plate, a surface of the inner rod body is slidably sleeved with a limiting ring, a first spring is mounted between a lower end face of the limiting ring and the upper end face of the lifting plate, the outer cylinder body is tightly sleeved on the limiting ring, and a top end of the outer cylinder body slides through a corresponding one of the second through grooves.

In an embodiment of the disclosure, a universal ball is mounted at the top end of the outer cylinder body, and an outer diameter of the outer cylinder body is the same as a diameter of the limiting rod.

In an embodiment of the disclosure, a limit plate is slidably disposed inside the outer cylinder body, and a bottom end of the limit plate is fixedly connected to a top end of the inner rod body.

In an embodiment of the disclosure, a side wall of the limit plate is in clearance fit with an inner wall of the outer cylinder body, and a diameter of the limit plate is greater than an inner diameter of the limiting ring.

In an embodiment of the disclosure, the upper end face of the lifting plate is provided with a positioning mechanism, the positioning mechanism includes a positioning column, three supporting columns and three sliding blocks, the three supporting columns are disposed on a side wall of the positioning column at equal intervals, an end of each of the three supporting columns is hinged to the positioning column, another end of each of the three supporting columns is hinged to a corresponding one of the three sliding blocks, a plate surface of the lifting plate is provided with sliding grooves corresponding to the sliding blocks, and the sliding blocks are respectively connected to sliding grooves in a sliding insertion mode, a second spring is mounted between each of the sliding blocks and an inner wall of the corresponding sliding groove, and a plate surface of the loading platform is provided with a through hole corresponding to the positioning column.

In an embodiment of the disclosure, a center of the positioning column is provided with a square through groove, a lower frame plate is mounted in the square through groove, an upper frame plate is mounted on an upper end face of the lower frame plate, a collecting cavity is defined between a side wall of the upper frame plate and an inner wall of the square through groove, two shaft rods are rotatably mounted in the square through groove, a blocking plate is fixed to a rod body of each of the shaft rods, and a tension spring is mounted between a lower end face of the blocking plate and the upper end face of the lower frame plate.

In an embodiment of the disclosure, a rod body is mounted inside each of the sliding grooves, and the sliding block is slidably sleeved on the rod body.

In an embodiment of the disclosure, a side wall of the sliding block is tightly attached to the inner wall of the sliding groove, and the second spring is sleeved on the rod body.

In an embodiment of the disclosure, the upper end face of the upper frame plate and the lower end face of the blocking plate are attached and sealed, and the side wall of the blocking plate and the inner wall of the square through groove are sealed and attached.

In an embodiment of the disclosure, a negative pressure adsorption mechanism is disposed on the surface of the lifting plate, the negative pressure adsorption mechanism includes an outer ring body and an inner ring body, the outer ring body and the inner ring body are both mounted on the upper end face of the lifting plate, the inner ring body is disposed inside the outer ring body, the outer ring body and the inner ring body are coaxially arranged, a top of the outer ring body and a top of the inner ring body are mounted with sealing rubber rings, an air suction cavity is defined between the outer ring body and the inner ring body, a suction pump is mounted on the lower end face of the lifting plate, an input end of the suction pump is in communication with the air suction cavity, and the surface of the loading platform is provided with negative pressure adsorption holes.

In an embodiment of the disclosure, each of the negative pressure adsorption holes is a stepped hole, an annular elastic rubber ring is mounted at an upper end portion of the negative pressure adsorption hole, and an upper end portion of the annular elastic rubber ring extends above the loading platform.

The beneficial effects of the tire mold cleaning device according to the embodiments of the disclosure are as follows. A tire mold is cleaned under cooperation of the linear sliding rails and the loading platform, the limiting rods can limit a moving range of the tire mold, thereby preventing the tire mold from sliding under the action of inertia; In addition, a position of the tire mold can be finely adjusted under cooperation of the telescopic members and the elastic telescopic rods, which is more conducive to the positioning of the tire mold and the subsequent processing of the tire mold.

Additional aspects and advantages of the disclosure will be given in the following description, and some will become obvious from the following description, or may be learned through the practice of the disclosure.

In the related art, when a loading device is used to load a tire mold to be cleaned, if the worker accidentally touches a control button, a movable end of the loading device moves, which will change a position of the tire mold, thereby affecting cleaning of the tire mold.

In the disclosure, when the driving motor drives the lead screw to rotate, the lifting plate moves up with the rotation of the load screw, the sliding blocks and the supporting columns on the surface of the lifting plate drive the positioning column to move up, and the linear sliding rails drive the loading platform to move; When the top end of the positioning column is in contact with the lower end face of the loading platform, the lifting plate and the loading platform continue to move, and the sliding blocks slide in the sliding grooves to adjust a distance between the lifting plate and the positioning column; After the through hole opened on the surface of the loading platform moves directly above the positioning column, the slide blocks and the support columns support the positioning column to move up under the support of the second springs, so that the positioning column is inserted into the through hole to position the loading platform, thereby to avoid the shifting of the loading platform, which can avoid the phenomenon of changing the position of the tire mold due to the shifting of the loading platform and make the positioning of the tire mold more stable, and it is more conducive to the subsequent cleaning of the tire mold.

Under the pulling of the tension springs, the lower end faces of the blocking plates are attached to the top end of the upper frame plate, and opposite sides of the two blocking plates are tightly attached together, and thus the two blocking plates close a central hollow of the upper frame plate, and the lower frame plate, the upper frame plate and the two blocking plates close the square through groove opened in the center of the positioning column. When the cleaning head cleans an inner wall of the tire mold, the situation that dust generated by removal falls onto a surface of the lead screw through the square through groove can be avoided, so that dust can be prevented from being attached to the surface of the lead screw, and the influence of dust on use of the lead screw can be reduced.

In addition, when the driving motor drives the lead screw to rotate reversely, the lifting plate moves down and drives the positioning column and the blocking plates to move down, when the blocking plates move down to be in contact with the lead screw, the lead screw pushes the blocking plates to enable the blocking plates to rotate around the shaft rods, thus the lead screw can be prevented from influencing the positioning column to move up and down, the dust deposited on the upper end faces of the blocking plates can slide to the upper end face of the lower frame plate due to the blocking plates being capable of inclining, and then the dust can be collected.

In the related art, when the tire mold is cleaned, the cleaning head is usually driven by a moving device to clean the tire mold, and if the cleaning head accidentally touches the tire mold, the tire mold is easy to move, which easily affects the cleaning of the tire mold.

In the disclosure, when the tire mold to be cleaned is placed on the upper end face of the loading platform and located above the negative pressure adsorption holes, the driving motor drives the lead screw to rotate, the lifting plate moves up with the rotation of the lead screw, the outer ring body and the inner ring body are driven to move up, the sealing rubber rings disposed on the top ends of the outer ring body and the inner ring body firstly are attached to the lower end face of the loading platform, so that the sealing performance among the outer ring body, the lifting plate, the inner ring body and the loading platform can be improved. The loading platform is driven by the linear sliding rails to move, after the negative pressure adsorption holes on the surface of the loading platform are communicated with the air suction cavity defined between the outer ring body and the inner ring body, the suction pump is started to pump the gas in the air suction cavity, then the gas in the negative pressure adsorption holes is extracted, the negative pressure is formed in the negative pressure adsorption holes, and the tire mold can be adsorbed to the upper end face of the loading platform under the action of the negative pressure, thus the tire mold can be fixed and cannot move easily, which is convenient for the tire mold to be cleaned.

BRIEF DESCRIPTION OF DRAWINGS

In order to more clearly explain technical solutions of embodiments of the disclosure, the following will briefly introduce the drawings that need to be used in the embodiments of the disclosure. It should be understood that the following drawings only show some of the embodiments of the disclosure, and therefore should not be regarded as limiting the scope. For those skilled in the art, other relevant drawings can also be obtained from these drawings without creative work.

DESCRIPTION OF REFERENCE SYMBOLS

Figure 1:
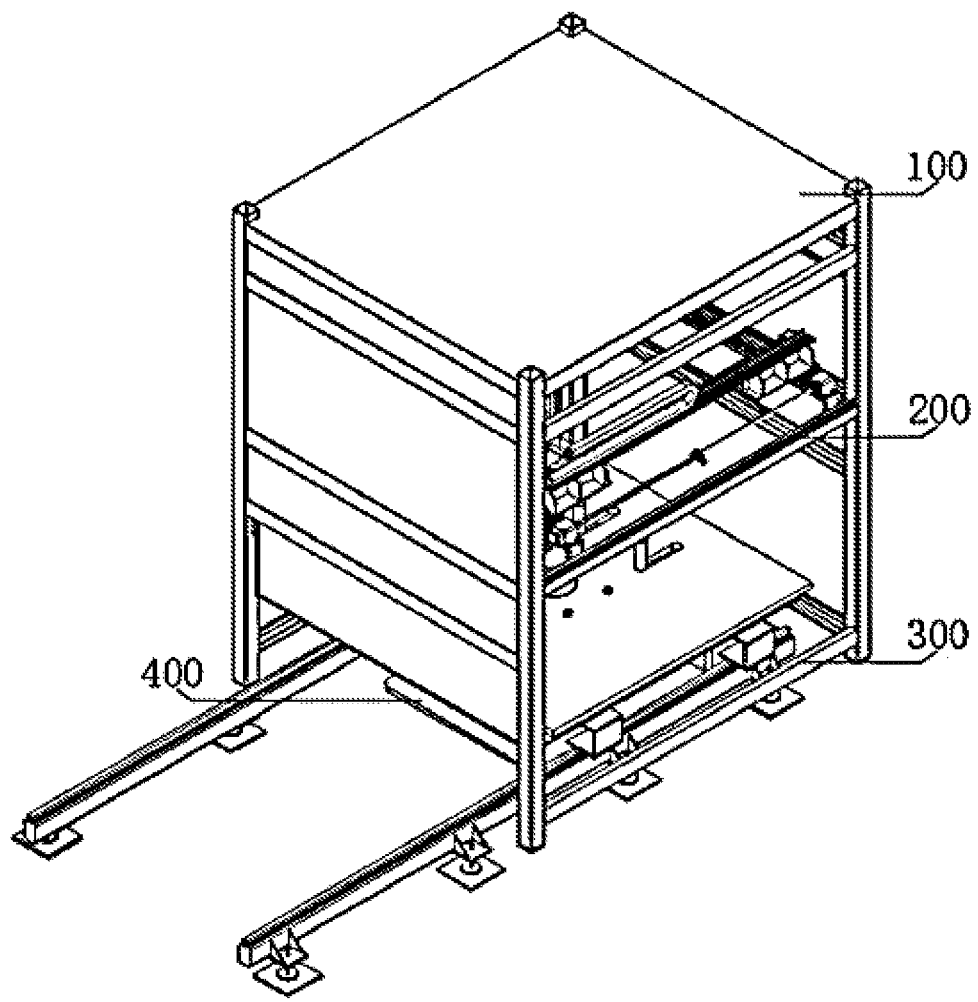
FIG. 1 illustrates a schematic structural diagram of an interior of a protective cover according to an embodiment of the disclosure.

100: protective cover; 110: lifting door; 200: cleaning mechanism; 210: motion system; 220: single-shaft rotating assembly; 221: bracket; 222: speed reducer; 223: rotating shaft; 230: cleaning head; 300: loading mechanism; 310: linear sliding rail; 320: loading platform; 321: first through groove; 322: second through groove; 323: through hole; 324: negative pressure adsorption hole; 400: limiting mechanism; 410: base plate; 411: guide rod; 420: limit rod; 430: drive motor; 440: load screw; 450: lifting plate; 451: sliding groove; 452: rod body; 460: telescopic member; 470: sliding plate; 480: elastic telescopic rod; 481: inner rod body; 482: outer cylinder body; 483: limit ring; 484: first spring; 485: limit plate; 500: positioning mechanism; 510: positioning column; 520: support column; 530: sliding block; 540: second spring; 550: square through groove; 551: shaft rod; 560: lower frame plate; 570: upper frame plate; 580: blocking plate; 590: tension spring; 600: negative pressure adsorption mechanism; 610: outer ring body; 620: inner ring body; 630: sealing rubber ring; 640: air suction cavity; 650: suction pump.

DETAILED DESCRIPTION OF EMBODIMENTS

The technical solutions in the embodiments of the disclosure will be described below in combination with the drawings in the embodiments of the disclosure.

In order to make purposes, technical solutions and advantages of the embodiments of the disclosure clearer, the technical solutions in the embodiments of the disclosure will be described clearly and completely in combination with the drawings in the embodiments of the disclosure. Apparently, the described embodiments are some of the embodiments of the disclosure, not all the embodiments. Based on the embodiments in the disclosure, all other embodiments obtained by those skilled in the art without creative work fall within the scope of protection in the disclosure.

The following will give a clear and complete description of the technical solutions in the embodiments of the disclosure in combination with the drawings in the embodiments of the disclosure.

As shown in FIG. 1 to FIG. 9, a tire mold cleaning device according to an embodiment of the disclosure includes: a protective cover 100, a cleaning mechanism 200, a loading mechanism 300, and a limiting mechanism 400.

The cleaning mechanism 200 is disposed inside the protective cover 100. The loading mechanism 300 is used to convey and load a tire mold. The limiting mechanism 400 is used to limit movement of the tire mold.

The cleaning mechanism 200 is disposed inside the protective cover 100.

The loading mechanism 300 includes linear sliding rails 310 and a loading platform 320, the linear sliding rails 310 are mounted at bottom ends of the protective cover 100 and disposed inside the protective cover 100. The loading platform 320 is connected to movable ends of the linear sliding rails 310. In a specific implementation, the linear sliding rails 310 are an electric sliding table, and the linear sliding rails 310 are used to convey the loading platform 320.

The limiting mechanism 400 includes a base plate 410 and limit rods 420. The base plate 410 is disposed at a bottom side of the protective cover 100 and inside the protective cover 100, and an upper end face of the base plate 410 is provided with a drive motor 430. An output shaft of the drive motor 430 is connected with a load screw 440. The load screw 440 is threadedly sleeved with a lifting plate 450. The upper end face of the base plate 410 is provided with guide rods 411, and top ends of the guide rods 411 slidably penetrate through the lifting plate 450. The number of the limit rods 420 are two, bottom ends of the two limit rods 420 are mounted on the upper end face of the lifting plate 450, and a surface of the loading platform 320 is provided with first through grooves 321 corresponding to the lifting plate 450. In a specific implementation, the drive motor 430 is a servo motor, and the output shaft of the drive motor 430 is capable of performing forward and reverse rotation. When the drive motor 430 drives the load screw 440 to rotate, the lifting plate 450 can drive the limit rods 420 to carry out moving up and down.

Specifically, a lower end face of the lifting plate 450 is provided with telescopic members 460, and movable ends of the telescopic members 460 are connected with a sliding plate 470, an upper end face of the sliding plate 470 is provided with two elastic telescopic rods 480, and the surface of the loading platform 320 is provided with second through grooves 322 corresponding to the elastic telescopic rods 480, respectively. In an implementation, the telescopic member 460 can be any of the air cylinder, electric cylinder, electric push rod and hydraulic cylinder. When the telescopic member 460 is stretched out and drawn back, it can drive the sliding plate 470 and the elastic telescopic rods 480 to move, and to adjust the distance between the elastic telescopic rods 480 and the limit rods 420.

The working process of the tire mold cleaning device according to a specific embodiment of the disclosure is described below with reference to the attached drawings.

A tire mold to be cleaned is placed on the upper end face of the loading platform 320, the loading platform 320 is moved by the linear sliding rails 310, and then the tire mold on the surface of the loading platform 320 is conveyed and loaded.

When the loading platform 320 moves to the interior of the protective cover 100, the drive motor 430 is started, and the drive motor 430 drives the load screw 440 to rotate, so that the lifting plate 450, the telescopic members 460 and the elastic telescopic rods 480 move up, and the limit rods 420 on the upper end face of the lifting plate 450 slide through the first through grooves 321, and the limit rods 420 limit the movement of the tire mold, thereby avoiding the tire mold to slide under the action of inertia when the linear sliding rails 310 stop conveying.

The elastic telescopic rods 480 pass through the second through grooves 322. If the tire mold does not contact the limit rods 420, the telescopic members 460 are adjusted to be drawn back, the movable ends of the telescopic members 460 drive the sliding plate 470 and the elastic telescopic rods 480 to move, and the elastic telescopic rods 480 push the tire mold to adjust its position, thereby achieving fine adjustment of the position of the tire mold.

After the position of the tire mold is determined, the tire mold is cleaned by the cleaning mechanism 200.

The tire mold cleaning device according to the embodiment of the disclosure can clean the tire mold through the cooperation of the linear slide rails 310 and the loading platform 320, and the limit rods 420 can limit the moving range of the tire mold, which can prevent the tire mold from sliding under the action of inertia. In addition, the position of the tire mold can be finely adjusted with the cooperation of the telescopic members 460 and the elastic telescopic rods 480, which is more conducive to the positioning of the tire mold and the subsequent processing of the tire mold.

In addition, the tire mold cleaning device according to the embodiments of the disclosure further has the following additional technical features.

Figure 2:
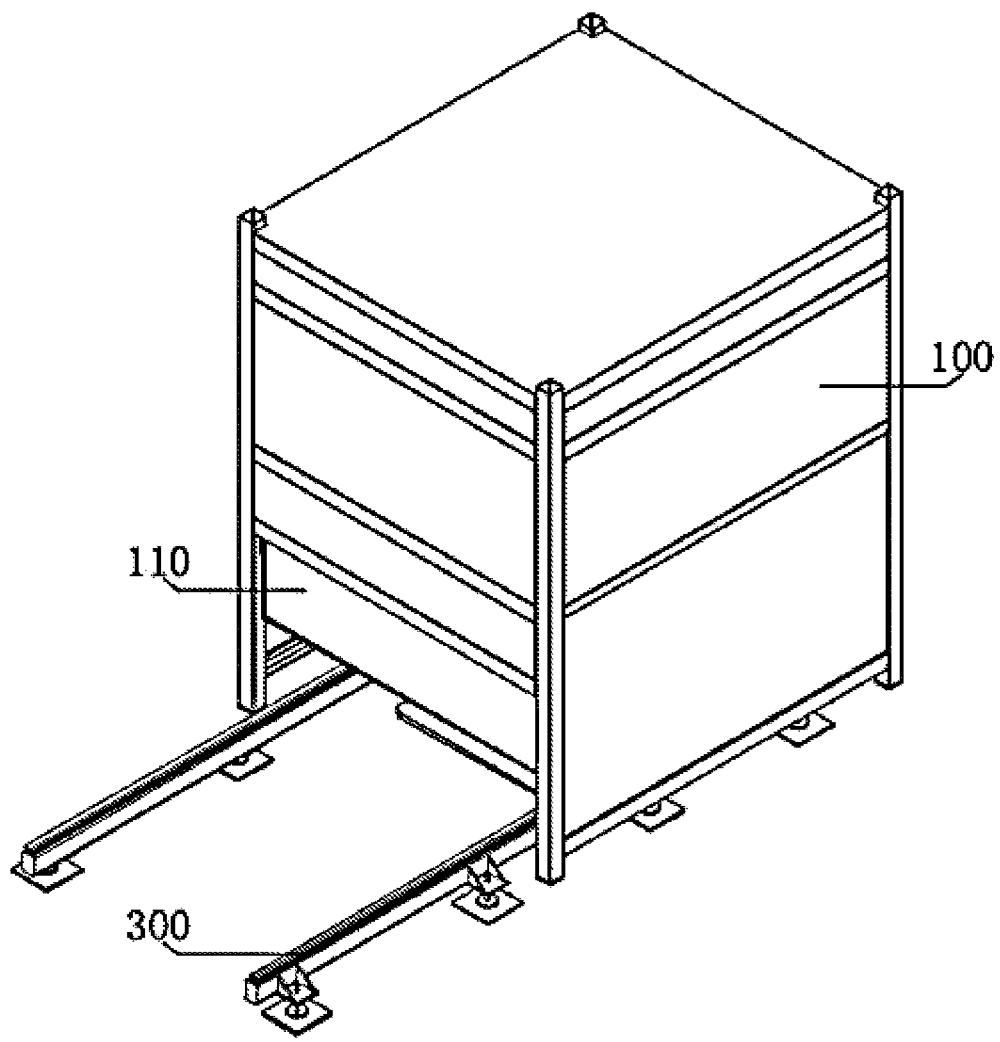
FIG. 2 illustrates a schematic structural diagram of a tire mold cleaning device according to an embodiment of the disclosure.

According to an embodiment of the disclosure, as shown in FIGS. 1 and 2, a side wall of the protective cover 100 is provided with an opening for entering and exiting, and the opening of the protective cover 100 is provided with a lifting door 110. In a specific implementation, the opening is provided to facilitate the tire mold to enter or exit the protective cover 100, while the lifting door 110 is provided to be conducive to closing the opening of the protective cover 100.

Figure 3:
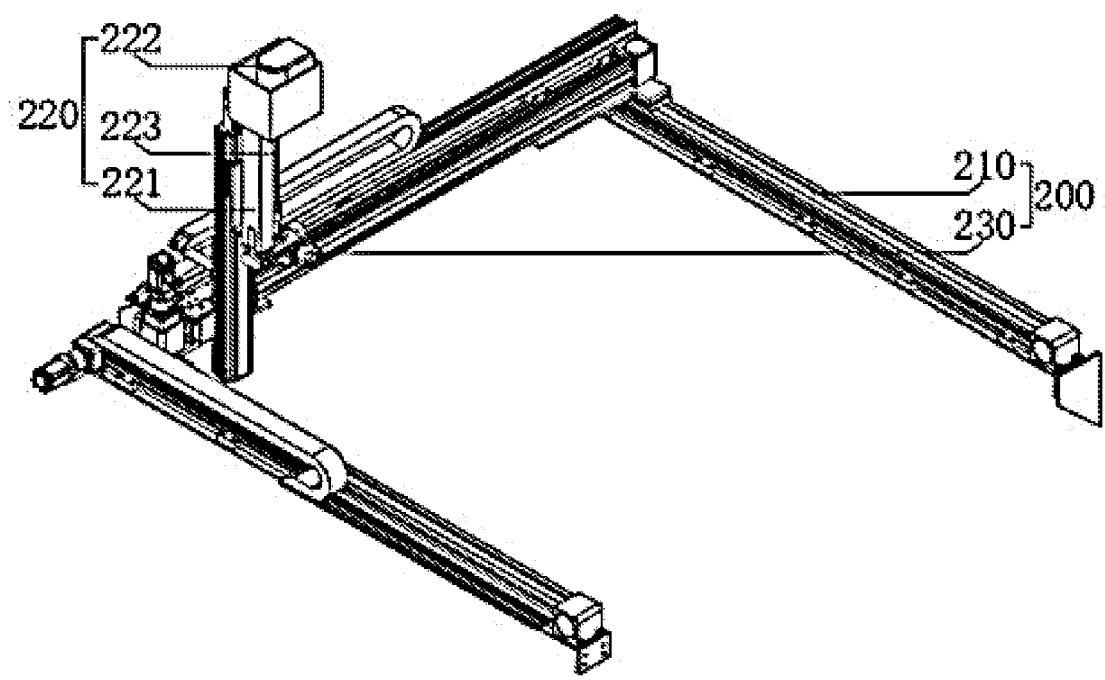
FIG. 3 illustrates a schematic structural diagram of a cleaning mechanism according to an embodiment of the disclosure.
Figure 4:
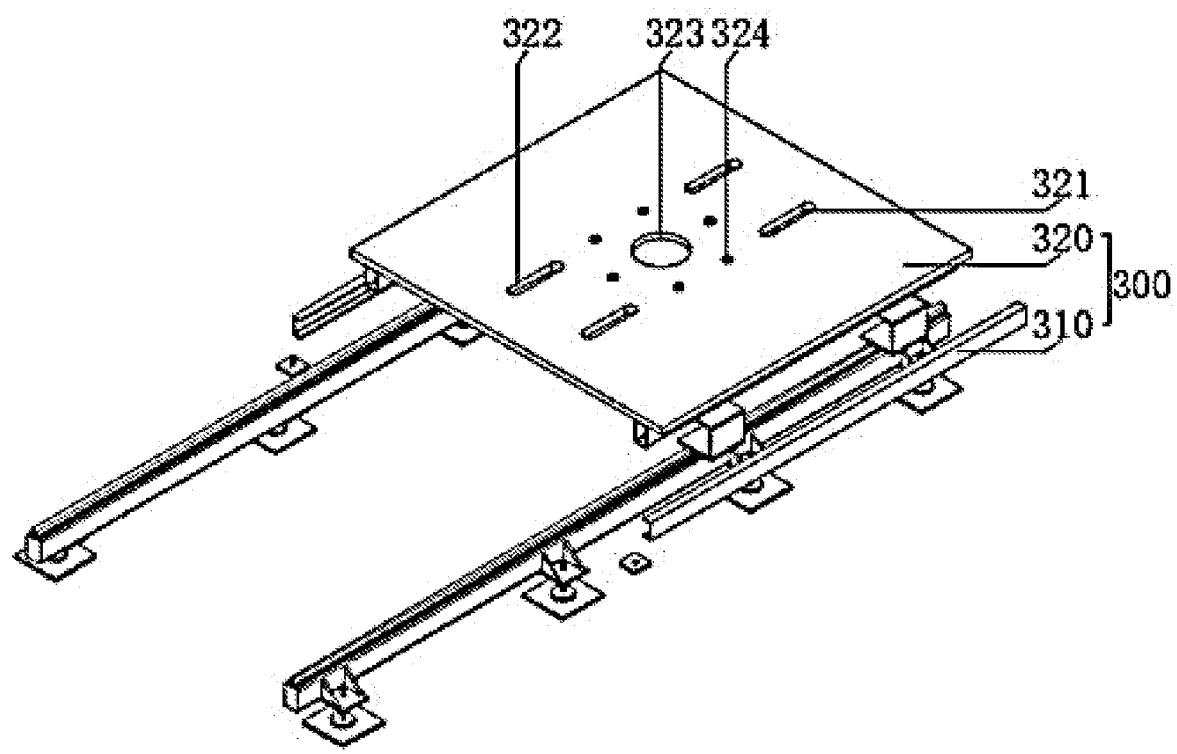
FIG. 4 illustrates a schematic structural diagram of a loading mechanism according to an embodiment of the disclosure.

According to an embodiment of the disclosure, as shown in FIGS. 2 and 3, the cleaning mechanism 200 includes a motion system 210, a single-shaft rotating assembly 220 and a cleaning head 230. The motion system 210 is mounted inside the protective cover 100, the single-shaft rotating assembly 220 is connected to a movable end of the motion system 210, and the cleaning head 230 is disposed at a rotating end of the single-shaft rotating assembly 220. In a specific implementation, the motion system 210 is used to move the single-shaft rotating assembly 220 and the cleaning head 230, and the single-shaft rotating assembly 220 is used to rotate the cleaning head 230, thus the angle of the cleaning head 230 can be adjusted while the cleaning head moves, which is conducive to cleaning different parts of the tire mold. In an illustrated embodiment, the motion system 210 is a rectangular coordinate robot, and the cleaning head 230 is a laser cleaning head.

According to an embodiment of the disclosure, as shown in FIG. 3, the single-shaft rotating assembly 220 includes a bracket 221 and a speed reducer 222. The bracket 221 is connected to the movable end of the motion system 210, the speed reducer 222 is mounted on a top end of the bracket 221, an output shaft of the speed reducer 222 is in transmission connection with a rotating shaft 223, and the cleaning head 230 is connected to the rotating shaft 223. In a specific implementation, the speed reducer 222 drives the rotating shaft 223 to rotate, then the cleaning head 230 is rotated with the rotation of the rotating shaft 223, thus the angle of the cleaning head 230 can be adjusted.

According to an embodiment of the disclosure, as shown in FIGS. 2 and 5-7, the guide rods 411, the limit rods 420, the lead screw 440 and the elastic telescopic rods 480 are parallel to one another, and the number of the guide rods 411 are at least two. The guide rods 411 are provided to limit the moving direction of the lifting plate 450, which can make the lifting plate 450 move more stable.

Figure 5:
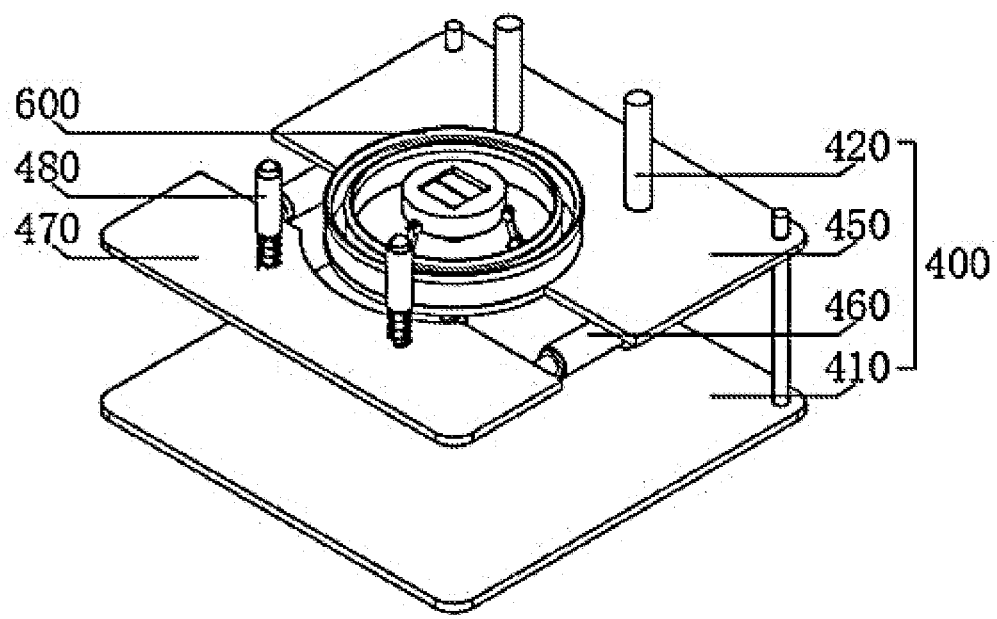
FIG. 5 illustrates a schematic structural diagram of a connection between a limiting mechanism and a negative pressure adsorption mechanism according to an embodiment of the disclosure.
Figure 6:
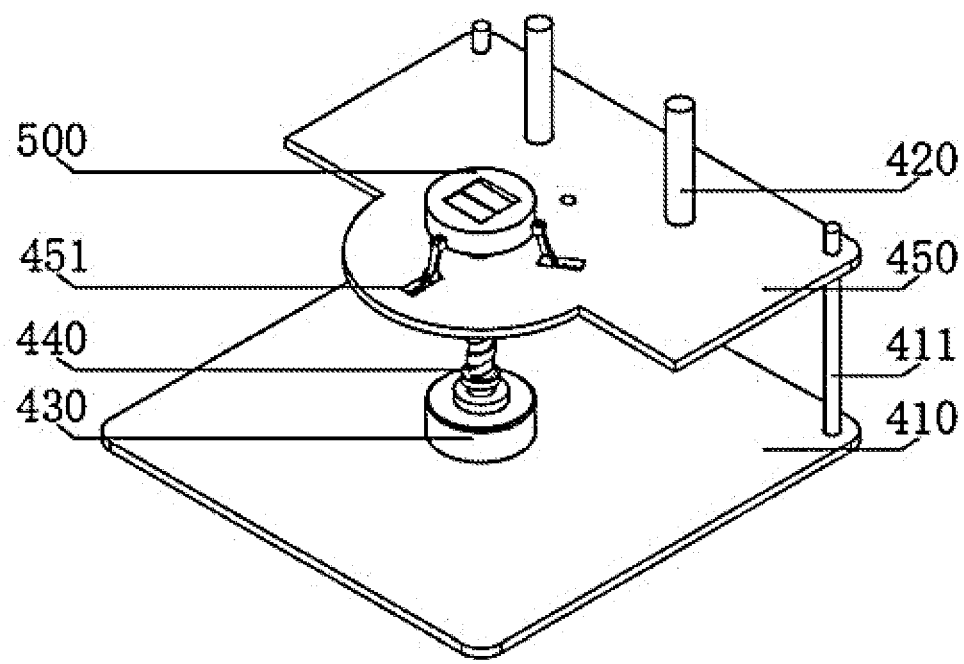
FIG. 6 illustrates a schematic structural diagram of a connection between a base plate and a lifting plate according to an embodiment of the disclosure.
Figure 7:
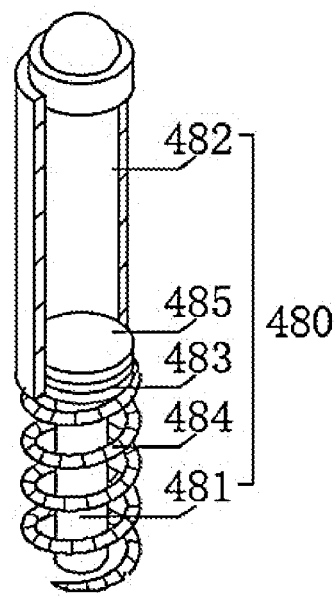
FIG. 7 illustrates a schematic structural diagram of an elastic telescopic rod according to an embodiment of the disclosure.
Figure 8:
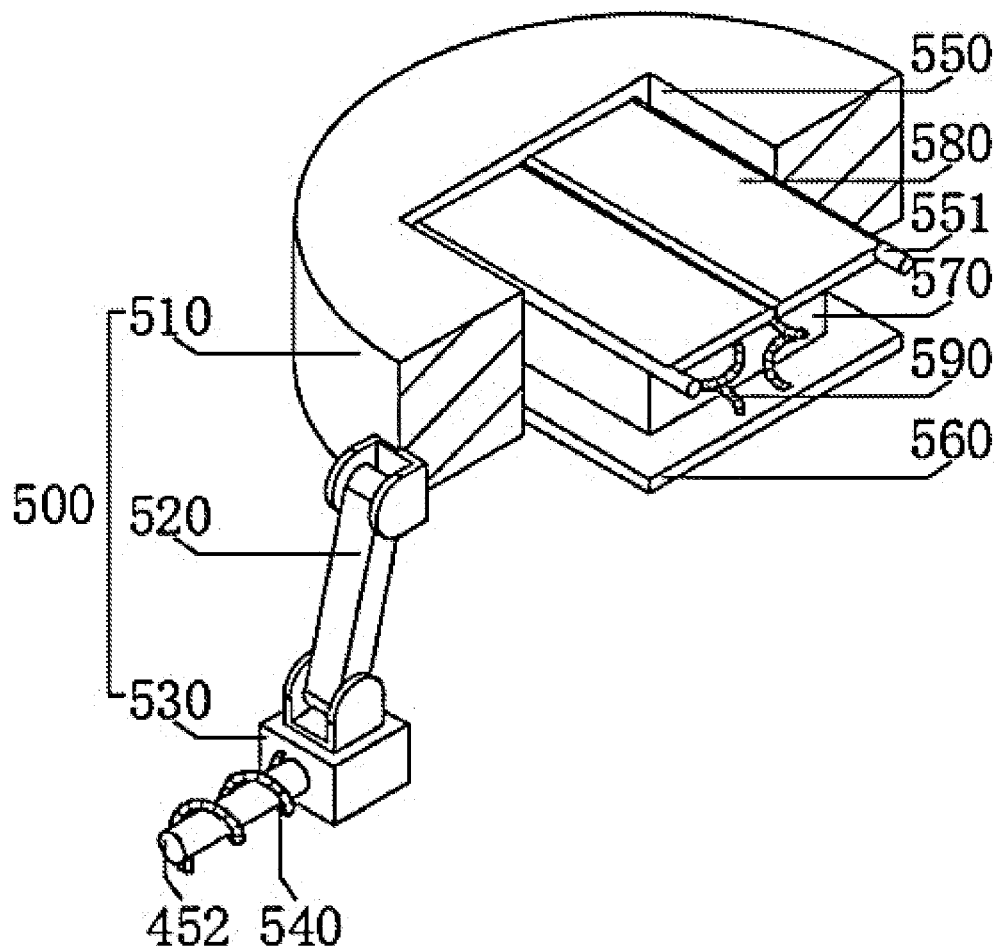
FIG. 8 illustrates a schematic structural diagram of an interior of a positioning column according to an embodiment of the disclosure.

According to an embodiment of the disclosure, as shown in FIGS. 5 and 7, the elastic telescopic rod 480 includes an inner rod body 481 and an outer cylinder body 482. The inner rod body 481 is fixed on the upper end face of the lifting plate 450, and a surface of the inner rod body 481 is slidably sleeved with a limit ring 483, a first spring 484 is mounted between a lower end face of the limit ring 483 and the upper end face of the lifting plate 450, the outer cylinder body 482 is tightly sleeved on the limit ring 483, and a top end of the outer cylinder body 482 slides through the second through groove 322. In a specific implementation, when the elastic telescopic rod 480 is inserted into the second through groove 322, and the tire mold blocks the elastic telescopic rod 480 from moving up, the elastic telescopic rod 480 is drawn back, which can prevent the elastic telescopic rod 480 from jacking up the tire mold and make the tire mold more stable on the surface of the loading platform 320. The sliding plate 470 and the elastic telescopic rods 480 are moved by the movable ends of the telescopic members 460, after the elastic telescopic rods 480 are removed from a lower of the tire mold, the first spring 484 supports the limit ring 483 to move, thereby to support the outer cylinder body 482 to move up, and when the outer cylinder body 482 is moved up, the elastic telescopic rod 480 is stretched out.

Furthermore, the top end of the outer cylinder body 482 is provided with a universal ball, and an outer diameter of the outer cylinder body 482 is the same as a diameter of the limit rod 420. When the top end of the elastic telescopic rod 480 is in contact with the tire mold, the universal ball can reduce the friction between the outer cylinder body 482 and the tire mold, which is more conducive to the relative movement between the elastic telescopic rod 480 and the tire mold.

It can be understood that a limit plate 485 is slidably disposed inside the outer cylinder body 482, and a bottom end of the limit plate 485 is fixedly connected with a top end of the inner rod body 481. The limit plate 485 can limit the moving range of the outer cylinder body 482 by limiting the movement of the limit ring 483, thus preventing the outer cylinder body 482 from falling off the surface of the inner rod body 481. In an illustrated embodiment, the clearance fit is adopted between a side wall of the limit plate 485 and an inner wall of the outer cylinder body 482, and a diameter of the limit plate 485 is greater than an inner diameter of the limit ring 483. The clearance fit is adopted to facilitate the relative movement between the limit plate 485 and the outer cylinder body 482.

In the related art, when using a loading device to load a tire mold to be cleaned, if the worker touches a control button by mistake, a movable end of the loading device moves, which will change a position of the tire mold and affect the cleaning of the tire mold.

According to an embodiment of the disclosure, as shown in FIGS. 2, 4-6 and 8, the upper end face of the lifting plate 450 is provided with a positioning mechanism 500, which includes a positioning column 510, support columns 520 and sliding blocks 530. There are three support columns 520 and three sliding blocks 530, the three support columns 520 are equally spaced on a side wall of the positioning column 510, ends of the three support columns 520 are hinged on the positioning column 510, and another ends of the three support columns 520 are hinged with the corresponding sliding blocks 530. A plate surface of the lifting plate 450 is provided with sliding grooves 451 corresponding to the sliding blocks 530, and the sliding blocks 530 are respectively connected to the sliding grooves 451 in a sliding insertion mode, a second spring 540 is mounted between each sliding block 530 and an inner wall of the corresponding sliding groove 451, and the plate surface of the loading platform 320 is provided with a through hole 323 corresponding to the positioning column 510. In a specific implementation, the positioning column 510 is inserted into the through hole 323 to limit the movement of the loading platform 320, which can avoid the movement of the loading platform 320.

In an illustrated embodiment, a center of the positioning column 510 is provided with a square through groove 550, the square through groove 550 is mounted with a lower frame plate 560 therein, an upper end face of the lower frame plate 560 is mounted with an upper frame plate 570, a collecting cavity is defined between a side wall of the upper frame plate 570 and an inner wall of the square through groove 550, two shaft rods 551 are rotatably mounted in the square through groove 550, and a rod body of each shaft rod 551 is fixed with a blocking plate 580, a tension spring 590 is mounted between a lower end face of each blocking plate 580 and the upper end face of the lower frame plate 560. In a specific implementation, when the tension spring 590 is not subjected to external force, the lower end face of the blocking plate 580 is in contact with the top end of the upper frame plate 570.

It should be noted that when the drive motor 430 drives the load screw 440 to rotate, the lifting plate 450 moves up with the rotation of the load screw 440, the sliding blocks 530 and the support columns 520 on the surface of the lifting plate 450 drive the positioning column 510 to move up, and the linear sliding rails 310 drive the loading platform 320 to move; When the top end of the positioning column 510 is in contact with the lower end face of the loading platform 320, the lifting plate 450 and the loading platform 320 continue to move, and the sliding blocks 530 slide in the sliding grooves 451 to adjust a distance between the lifting plate 450 and the positioning column 510; After the through hole 323 opened on the surface of the loading platform 320 moves directly above the positioning column 510, the positioning column 510 is inserted into the through hole 323 by moving up under the support of the second springs 540, the sliding blocks 530 and the support columns 520, so that the positioning column 510 can position the loading platform 320 to avoid the movement of the loading platform 320, which can avoid the phenomenon of changing the position of the tire mold due to the shifting of the loading platform 320, and make the positioning of the tire mold more stable, and it is more conducive to the subsequent cleaning of the tire mold.

Under the pulling of the tension springs 590, the lower end faces of the blocking plates 580 are attached to the top end of the upper frame plate 570, and opposite sides of the two blocking plates 580 are tightly attached together, and thus the two blocking plates 580 close a central hollow of the upper frame plate 570, and the lower frame plate 560, the upper frame plate 570 and the two blocking plates 580 close the square through groove 550 opened in the center of the positioning column 510. When the cleaning head 230 cleans an inner wall of the tire mold, the situation that dust generated by removal falls onto a surface of the lead screw 440 through the square through groove 550 can be avoided, so that dust can be prevented from being attached to the surface of the lead screw 440, and the influence of dust on the use of the lead screw 440 can be reduced.

In addition, when the drive motor 430 drives the lead screw 440 to rotate reversely, the lifting plate 450 moves down and drives the positioning column 510 and its internal blocking plates 580 to move down, when the blocking plates 580 move down to be in contact with the lead screw 440, the lead screw 440 pushes the blocking plates 580 to enable the blocking plates 580 to rotate around the shaft rods 551, thus the lead screw 440 can be prevented from affecting the positioning column 510 to move up and down, and the blocking plates 580 can be inclined to make the dust deposited on their upper end faces slide to the upper end face of the lower frame plate 560, thereby collecting dust.

According to an embodiment of the disclosure, a rod body 452 is mounted inside each sliding groove 451, and the sliding block 530 is slidably sleeved on the rod body 452. The rod body 452 can limit the moving direction of the sliding block 530 and make the sliding block 530 move more stable. It can be understood that a side wall of the sliding block 530 is tightly attached to the inner wall of the sliding groove 451, and the second spring 540 is sleeved on the rod body 452, which can limit the movement of the second spring 540 and make the installation of the second spring 540 more stable.

According to an embodiment of the disclosure, the upper end surface of the upper frame plate 570 and the lower end surface of the blocking plate 580 are attached and sealed, and the side wall of the blocking plate 580 and the inner wall of the square through groove 550 are sealed and attached, which is beneficial for the blocking plates 580 to hinder the dust from passing through the square through groove 550.

In the related art, when the tire mold is cleaned, the cleaning head is usually driven by a moving device to clean the tire mold, and if the cleaning head accidentally touches the tire mold, the tire mold is easy to move, which easily affects the cleaning of the tire mold.

Figure 9:
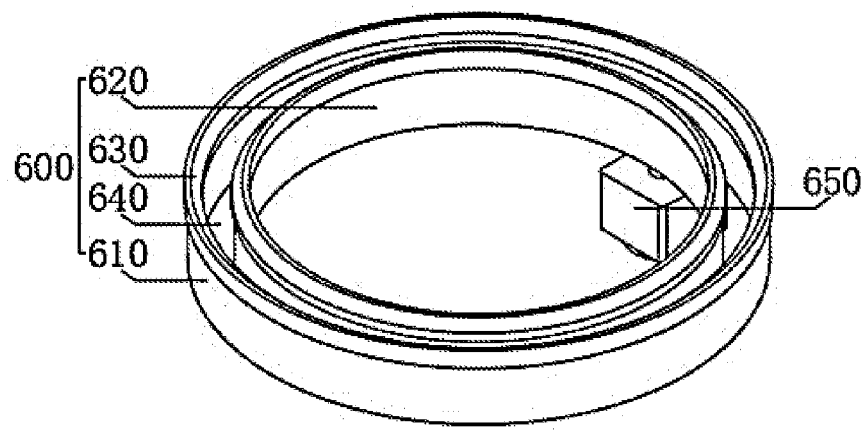
FIG. 9 illustrates a schematic structural diagram of a negative pressure adsorption mechanism according to an embodiment of the disclosure.
Figure 10:
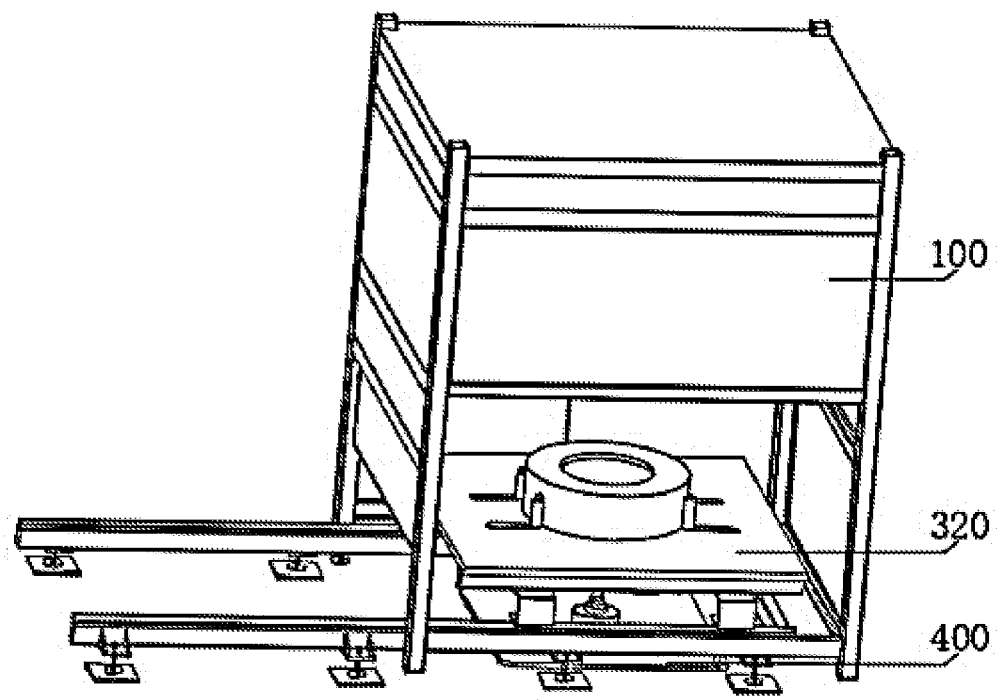
FIG. 10 illustrates a schematic structural diagram of an assembly of a tire mold during a cleaning process according to an embodiment of the disclosure.

According to an embodiment of the disclosure, as shown in FIG. 5 and FIG. 9, the surface of the lifting plate 450 is provided with a negative pressure adsorption mechanism 600, the negative pressure adsorption mechanism 600 includes an outer ring body 610 and an inner ring body 620, the outer ring body 610 and the inner ring body 620 are both mounted on the upper end face of the lifting plate 450, and the inner ring body 620 is located inside the outer ring body 610. The outer ring body 610 and the inner ring body 620 are coaxially arranged, a top end of the outer ring body 610 and a top end of the inner ring body 620 are each provided with sealing rubber rings 630, an air suction cavity 640 is defined between the outer ring body 610 and the inner ring body 620, a suction pump 650 is mounted on the lower end surface of the lifting plate 450, and an input end of the suction pump 650 is in communication with the air suction cavity 640. A surface of the loading platform 320 is provided with negative pressure suction holes 324. In an illustrated embodiment, the negative pressure adsorption hole 324 is a stepped hole, an annular elastic rubber ring is mounted at an upper end portion of the negative pressure adsorption hole 324, and an upper end portion of the annular elastic rubber ring extends above the loading platform 320, thus when the tire mold to be cleaned is placed on the upper end surface of the loading platform 320 and disposed above the negative pressure adsorption holes 324, the tire mold can cover the negative pressure adsorption holes 324. The negative pressure adsorption holes 324 can be equidistantly arranged in a circumferential direction of the outer ring body 610 and the number of the negative pressure adsorption holes 324 is at least three.

It should be noted that when the tire mold to be cleaned is placed on the upper end face of the loading platform 320 and located above the negative pressure adsorption holes 324, the driving motor 430 drives the lead screw 440 to rotate, the lifting plate 450 moves up with the rotation of the load screw, the outer ring body 610 and the inner ring body 620 are driven to move up, the sealing rubber rings 630 disposed on the top ends of the outer ring body 610 and the inner ring body 620 firstly are attached to the lower end face of the loading platform 320, so that the sealing performance among the outer ring body 610, the lifting plate 450, the inner ring body 620 and the loading platform 320 can be improved. The loading platform 320 is driven by the linear sliding rails 310 to move, after the negative pressure adsorption holes 324 on the surface of the loading platform 320 are communicated with the air suction cavity 640 defined between the outer ring body 610 and the inner ring body 620, the suction pump 650 is started to pump the gas in the air suction cavity 640, then the gas in the negative pressure adsorption holes 324 is extracted, the negative pressure is formed in the negative pressure adsorption holes 324, the tire mold can be adsorbed on the upper end face of the loading platform 320 under the action of the negative pressure, thus the tire mold can be fixed and cannot move easily, which make the tire mold be cleaned more conveniently.

Other compositions and operations of the tire mold cleaning device according to the embodiments of the disclosure are known to those skilled in the art, and will not be described in detail herein.

The foregoing is merely the embodiments of the disclosure, and is not used to limit the scope of protection of the disclosure. For those skilled in the art, the disclosure may have various amendments and changes. Any amendment, equivalent replacement, improvement, etc. made within the spirit and principle of the disclosure shall fall within the scope of protection of the disclosure. It should be noted that similar reference numerals and letters represent similar items in the following drawings. Therefore, once a certain item is defined in one figure, it is not necessary to further define and interpret it in the subsequent figures.

What is claimed is:
1. A tire mold cleaning device, comprising:
a protective cover (100);
a cleaning mechanism (200), disposed inside the protective cover (100);
a loading mechanism (300), comprising linear sliding rails (310) and a loading platform (320); wherein the linear sliding rails (310) are mounted at bottom ends of the protective cover (100), and the loading platform (320) is connected to movable ends of the linear sliding rails (310);
a limiting mechanism (400), comprising:
a base plate (410), disposed at a bottom side of the protective cover (100) and inside the protective cover (100);
a driving motor (430), mounted on an upper end surface of the base plate (410);
a lead screw (440), in transmission connection with an output shaft of the driving motor (430);
a lifting plate (450), threadedly sleeved on a rod body of the lead screw (440);
guide rods (411), mounted on the upper end surface of the base plate (410), and a top end of each of the guide rods (411) slidably penetrating through the lifting plate (450);
two limiting rods (420), wherein a bottom end of each of the two limiting rods (420) is disposed on an upper end surface of the lifting plate (450);
telescopic members (460), mounted on a lower end surface of the lifting plate (450);
a sliding plate (470), connected to movable ends of the telescopic members (460); and
two elastic telescopic rods (480), mounted on the upper end surface of the sliding plate (470);
wherein a surface of the loading platform (320) is provided with first through grooves (321) corresponding to the lifting plate (450), and provided with second through grooves (322) corresponding to the elastic telescopic rods (480);
wherein an upper end face of the lifting plate (450) is provided with a positioning mechanism (500), comprising: a positioning column (510), support columns (520) and sliding blocks (530); the number of the support columns (520) is three, the number of the sliding blocks (530) is three, the three support columns (520) are equally spaced on a side wall of the positioning column (510), ends of the three support columns (520) are hinged on the positioning column (510), and another ends of the three support columns (520) are hinged with the corresponding sliding blocks (530); a plate surface of the lifting plate (450) is provided with sliding grooves (451) corresponding to the sliding blocks (530), and the sliding blocks (530) are respectively connected to the sliding grooves (451) in a sliding insertion mode; a second spring (540) is mounted between each sliding block (530) and an inner wall of the corresponding sliding groove (451), and the plate surface of the loading platform (320) is provided with a through hole (323) corresponding to the positioning column (510);
wherein a center of the positioning column (510) is provided with a square through groove (550), the square through groove (550) is mounted with a lower frame plate (560) therein, an upper end face of the lower frame plate (560) is mounted with an upper frame plate (570), a collecting cavity is defined between a side wall of the upper frame plate (570) and an inner wall of the square through groove (550), two shaft rods (551) are rotatably mounted in the square through groove (550), a rod body of each shaft rod (551) is fixed with a blocking plate (580), and a tension spring (590) is mounted between a lower end face of each blocking plate (580) and the upper end face of the lower frame plate (560).

2. The tire mold cleaning device according to claim 1, wherein a side wall of the protective cover (100) is provided with an opening for entering and exiting, and the opening of the protective cover (100) is provided with a lifting door (110).

3. The tire mold cleaning device according to claim 1, wherein the cleaning mechanism (200) comprises a motion system (210), a single-shaft rotating assembly (220) and a cleaning head (230), the motion system (210) is mounted inside the protective cover (100), the single-shaft rotating assembly (220) is connected to a movable end of the motion system (210), and the cleaning head (230) is disposed at a rotating end of the single-shaft rotating assembly (220).

4. The tire mold cleaning device according to claim 3, wherein the motion system (210) is a rectangular coordinate robot, and the cleaning head (230) is a laser cleaning head.

5. The tire mold cleaning device according to claim 3, wherein the single-shaft rotating assembly (220) comprises a bracket (221), a speed reducer (222) and a rotating shaft (223), the bracket (221) is connected to the movable end of the motion system (210), the speed reducer (222) is mounted at a top end of the bracket (221), an output shaft of the speed reducer (222) is in transmission connection with the rotating shaft (223), and the cleaning head (230) is connected to the rotating shaft (223).

6. The tire mold cleaning device according to claim 1, wherein the guide rods (411), the limiting rods (420), the lead screw (440) and the elastic telescopic rods (480) are parallel to one another, and the number of the guide rods (411) is at least two.

7. The tire mold cleaning device according to claim 1, wherein each of the elastic telescopic rods (480) comprises an inner rod body (481), an outer cylinder body (482), a limiting ring (483), and a first spring (484); the inner rod body (481) is fixed on the upper end surface of the lifting plate (450), a surface of the inner rod body (481) is slidably sleeved with the limiting ring (483), the first spring (484) is mounted between a lower end surface of the limiting ring (483) and the upper end surface of the lifting plate (450), the outer cylinder body (482) is tightly sleeved on the limiting ring (483), and a top end of the outer cylinder body (482) slides through a corresponding one of the second through grooves (322).

8. The tire mold cleaning device according to claim 7, wherein a universal ball is mounted at the top end of the outer cylinder body (482), and an outer diameter of the outer cylinder body (482) is the same as a diameter of each of the limiting rods (420).

9. The tire mold cleaning device according to claim 7, wherein a limit plate (485) is slidably disposed inside the outer cylinder body (482), and a bottom end of the limit plate (485) is fixedly connected to a top end of the inner rod body (481).

10. The tire mold cleaning device according to claim 9, wherein a side wall of the limit plate (485) is in clearance fit with an inner wall of the outer cylinder body (482), and a diameter of the limit plate (485) is greater than an inner diameter of the limiting ring (483).

\* \* \* \* \*